United States Patent
Singh et al.

(10) Patent No.: US 9,319,996 B2
(45) Date of Patent: Apr. 19, 2016

(54) SYSTEM AND METHOD FOR DYNAMIC POWER REGULATION IN SMALL CELLS

(71) Applicant: QUALCOMM Incorporated, San Diego, CA (US)

(72) Inventors: Damanjit Singh, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 14/171,593

(22) Filed: Feb. 3, 2014

(65) Prior Publication Data

US 2014/0274195 A1    Sep. 18, 2014

Related U.S. Application Data

(60) Provisional application No. 61/789,958, filed on Mar. 15, 2013.

(51) Int. Cl.

| H04B 1/40 | (2015.01) |
|---|---|
| H04W 24/04 | (2009.01) |
| H04W 52/24 | (2009.01) |
| H04W 52/28 | (2009.01) |
| H04W 52/40 | (2009.01) |
| H04W 52/14 | (2009.01) |

(52) U.S. Cl.
CPC .......... *H04W 52/241* (2013.01); *H04W 52/285* (2013.01); *H04W 52/40* (2013.01); *H04W 52/143* (2013.01); *Y02B 60/50* (2013.01)

(58) Field of Classification Search
CPC .................................. H04B 1/40; H04W 24/04
See application file for complete search history.

(56) References Cited

U.S. PATENT DOCUMENTS

| 8,331,327 B1* | 12/2012 | Vargantwar ............. H04L 69/28 370/329 |
|---|---|---|
| 2009/0005043 A1 | 1/2009 | Claussen et al. |
| 2009/0111499 A1 | 4/2009 | Bosch et al. |
| 2010/0304745 A1 | 12/2010 | Patel et al. |
| 2011/0136523 A1* | 6/2011 | Kim ..................... H04B 7/0617 455/501 |
| 2012/0252479 A1 | 10/2012 | Morita et al. |
| 2013/0045749 A1 | 2/2013 | Sridhar et al. |
| 2013/0109387 A1 | 5/2013 | Tinnakornsrisuphap et al. |
| 2013/0157652 A1 | 6/2013 | Khaitan et al. |

OTHER PUBLICATIONS

International Search Report and Written Opinion issued Jun. 13, 2014; Application No. PCT/US2014/023555.

(Continued)

*Primary Examiner* — Bobbak Safaipour
(74) *Attorney, Agent, or Firm* — Arent Fox LLP

(57) ABSTRACT

Disclosed are systems and methods for dynamic power regulation in small cells. In one aspect, a system is configured to determining at least one mobility metric indicative of at least one access terminal mobility at the cell. The system then configured to determine whether the value of mobility metric is acceptable. When the value of mobility metric is unacceptable, the system is configured to increase the transmit power of the cell until the value of mobility metric becomes acceptable. If the value of mobility metric does not become acceptable after increasing the transmit power of the cell above a threshold, the system is configured to decrease the transmit power of the cell.

21 Claims, 12 Drawing Sheets

(56) References Cited

OTHER PUBLICATIONS

QUALCOMM Incorporated: "Mechanisms for efficient small cell operation", 3GPP Draft, R1-130595 Mechanisms for Efficient Small Cell Operation, 3rd Generation Partnership Project (3GPP), Mobile Competence Centre, 650, Route Des Lucioles, F-06921 Sophia-Antipolis Cedex, FR, vol. RAN WG1, no. St. Julian, Malta, 20130128-20130201 Jan. 19, 2013, XP050663851, pp. 1-3, Retrieved from the Internet: URL:http://www.3gpp.org/ftp/tsg ran/ WG1 RL 1/TSGR1 72/Docs/.

* cited by examiner

SYSTEM AND METHOD FOR DYNAMIC POWER REGULATION IN SMALL CELLS

CLAIM OF PRIORITY UNDER 35 U.S.C. §119

The present Application for patent claims priority to Provisional Application No. 61/789,958 filed on Mar. 15, 2013, and assigned to the assignee hereof and hereby expressly incorporated by reference herein.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. Due to their low power, these base stations create small area cells (also referred to herein as small cells). In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

In a small cell deployment, due to small coverage area of these cells, an active high speed mobile device may go through frequent handovers between neighboring small cells. Additionally, even a stationary or slow moving mobile device can experience frequent handovers due to channel fading if the mobile device is present at a location where pilot signals from different small cells are about the same strength (also known as a pilot pollution region). These frequent handovers between neighboring small cells are undesirable as they can cause packet losses, leading to voice artifacts and/or packet delays and/or poor user experience, as well as increase signaling load at the neighboring small cells, macrocells, and/or the core network. Also there may be mobility problems such as connection failures or handover failures due to unplanned deployment of small cells. Moreover, an unplanned deployment may also cause a number of access terminals to experience high interference. Therefore, transmit power of small cells may need to be adjusted to handle the above concerns.

SUMMARY

The following presents a simplified summary of one or more aspects of systems, methods and computer program products for dynamic regulation of transmit power of small cells (also referred herein as "low power cells"). This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later In one aspect, a system includes a mobility metric determiner component configured to determine at least one mobility metric of the cell. The system further includes a metric evaluator component configured to determine whether the value of mobility metric is acceptable or not. In one example, this may involve determining whether the value of mobility metric is above a mobility metric threshold. The system further includes a power regulator component configure to: when the mobility metric is unacceptable, increase the transmit power of the cell until the mobility metric of the cell becomes acceptable (for example, until the value of mobility metric reaches below the mobility metric threshold), and if the mobility metric of the cell does not become acceptable after increasing the transmit power of the cell above a threshold (for example, does not decrease below the mobility metric threshold), decrease the transmit power of the cell.

In another aspect, a method for regulating transmit power of a small cell includes determining at least one mobility metric indicative of at least one access terminal mobility at the cell. The method further includes determining whether the value of mobility metric is acceptable. When the value of mobility metric is unacceptable, increasing the transmit power of the cell until the value of mobility metric becomes acceptable. If the value of mobility metric does not become acceptable after increasing the transmit power of the cell above a threshold, decreasing the transmit power of the cell.

In one example aspect, an apparatus for regulating transmit power of a small cell, includes means for determining at least one mobility metric indicative of at least one access terminal mobility at the cell. The apparatus further includes means for determining whether the value of mobility metric is acceptable. The apparatus further includes means for, when the value of mobility metric is unacceptable, increasing the transmit power of the cell until the value of mobility metric becomes acceptable. The apparatus further includes means for, if the value of mobility metric does not become acceptable after increasing the transmit power of the cell above a threshold, decreasing the transmit power of the cell.

In another example aspect, a computer program product for regulating transmit power of a small cell includes a non-transitory computer readable medium, comprising: code for determining at least one mobility metric indicative of at least one access terminal mobility at the cell; code for determining whether the value of mobility metric is acceptable; code for, when the value of mobility metric is unacceptable, increasing the transmit power of the cell until the value of mobility metric becomes acceptable, and code for, if the value of mobility metric does not become acceptable after increasing the transmit power of the cell above a threshold, decreasing the transmit power of the cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
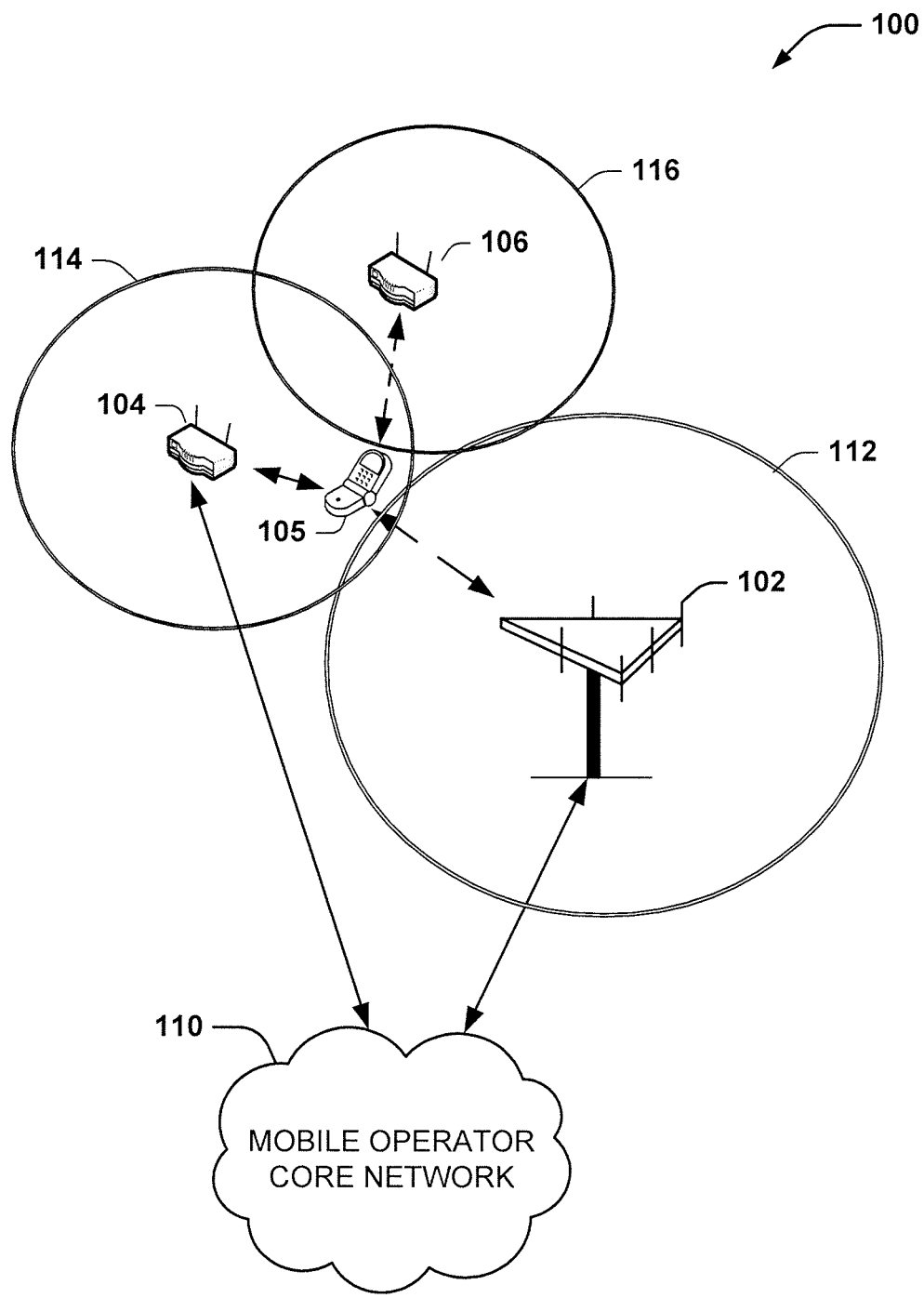
FIG. 1 is a schematic diagram of an example wireless communication system in which mechanisms for dynamic power regulation of small cells can be implemented.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In various aspects, disclosed herein systems and methods for dynamic power regulation of small cells. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

A small cell may be utilized for communicating with mobile devices(s). As generally known in the art, a mobile device can also be called a system, device, subscriber unit, subscriber station, mobile station, mobile, remote station, mobile terminal, remote terminal, access terminal, user terminal, terminal, communication device, user agent, user device, or user equipment (UE). A mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more base stations (BS) that provide cellular or wireless network access to the mobile device.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows an example wireless communication system 100. System 100 includes one or more high-power base stations 102 (also referred as macro nodes) that may provide mobile devices 105 with access to a wireless network, which is depicted as a mobile operator core network 110 (also referred as backhaul network), which provides telecommunication services, such as voice, data, video, etc. to mobile devices 105. The coverage area of a macro node 102 is referred to as a macrocell 112. The system 100 also includes a plurality of low-power base stations 104 and 106 (also referred as low-power nodes), which expand the coverage of the wireless network. The coverage areas of low-power nodes 104 and 106 are referred to as small cells 114 and 116, respectively.

In the depicted wireless network deployment, due to small coverage area of each small cell, an active high velocity mobile device 105 may go through frequent handovers when it travels across different small cells (e.g., small cells 114 and 116). Additionally, even a stationary or slow moving mobile device 105 can experience frequent handovers due to channel fading if it is present at a location where pilot signals from neighboring nodes (e.g., low-power nodes 104 and 106) are about the same strength (pilot pollution region). Frequent handovers between neighboring cells, where handovers involve the same set of cells, are referred to herein as "ping-pong handovers". Frequent handovers due to high velocity mobile device and ping-pong handovers between neighboring small cells due to stationary or a slow moving mobile device going through channel variations are undesirable as they can cause packet losses, leading to voice artifacts and/or packet delays and/or poor user experience, as well as increase signaling load at the neighboring nodes (e.g., low-power nodes 104 and 106) and/or core network 110. Also there may be mobility problems such as connection failures or handover failures due to unplanned deployment of small cells. Moreover, an unplanned deployment may also cause a number of access terminals to experience high interference. Therefore, transmit power of small cells may need to be adjusted to handle the above concerns. Thus, regulation of frequent handovers by a high velocity mobile device or ping-pong handovers between neighboring small cells by a stationary or slow moving mobile device is desired.

Generally, the following considerations may be taken into account when determining when and how to regulate handovers between small cells. First, small cells should provide significant capacity offload from the macrocells. Second, small cells should not significantly impact connected-mode mobility. Mobility state of the mobile device may be measured using one or more mobility metrics which are based on/related to the mobility of devices that have been/can be/are served by a cell. For example, such mobility metrics as handovers per unit time (for example, per minute), call drops per unit time (for example, per minute), connection failures per unit time (for example, per minute) and/or Radio Link Failures (RLFs) per unit time (for example, per minute) for a small cell should be preferably low, which saves signaling load, packet delays, etc. and improves user experience and helps network load. Also, the interference metrics, such as Signal-to-Interference-Plus-Noise Ratio (SINR) of a small cell, should be preferably high, which provides greater throughput. Third, pilot pollution regions, in which many mobile devices 105 spend time should preferably be minimized. In one aspect, these and other mobility and interference criteria can be controlled through the dynamic regulation of the transmit (Tx) power of the small cell.

To achieve an effective transmit power regulation, the advantages and disadvantage of high and low power small cells should be considered. For example, advantages of high transmit power include more offload from macrocells due to expanded coverage area of the small cell; and improvement in SINRs in certain situations, which leads to better throughput, especially, when the interference from neighboring small cells is low (e.g., at the macrocell edge, or when Enhanced Inter-cell Interference Coordination (eICIC) is deployed and there are no near neighboring small cells). Disadvantages of high transmit power typically include more interference to neighboring cells, which impacts on SINR and throughput on those cells; more likelihood of causing pilot pollution due to increase in small cell coverage area with high power that will overlap with coverage of neighboring small cells (or macrocell), and increase in ping-pong handovers for mobile devices within coverage of neighboring cells; and more handovers/reselections with neighboring macrocells and small cells due to increase in coverage area. Disadvantages of low transmit power of small cells typically include less offload from macrocells for the same number of small cells since coverage area of small cells reduces; and reduction in the SINRs, which leads to lower throughput. Advantages of low transmit power of small cells are typically low interference with neighboring cells, less likelihood of causing pilot pollution, and less handovers/reselections with neighboring macrocells and small cells due to decrease in coverage area.

Based on the observation of the advantages and disadvantages of high and low power of small cells, the primary goals for dynamic power regulation of a small cell may be, in one aspect, to increase the offload from the macrocell to the small cells and to minimize ping-pong handovers and connection failures between neighboring small cells (and macrocells). The term "ping-pong handover", as used herein, means frequent handovers between adjacent cells by a mobile device, wherein the number of handovers that determines the when handovers may be considered frequent may be specified by the network (for example, when the number of handovers per unit time is greater than a threshold) and may be based on network load, available wireless bandwidth or other parameters. Generally, these goals for dynamic power regulation can be achieved by, for example, increasing transmit power of a small cell to enable more offload from macrocell until significant impact to mobility is observed or when interference caused to the neighboring small cells is increasing without any/much benefit of getting more offload.

Figure 2:
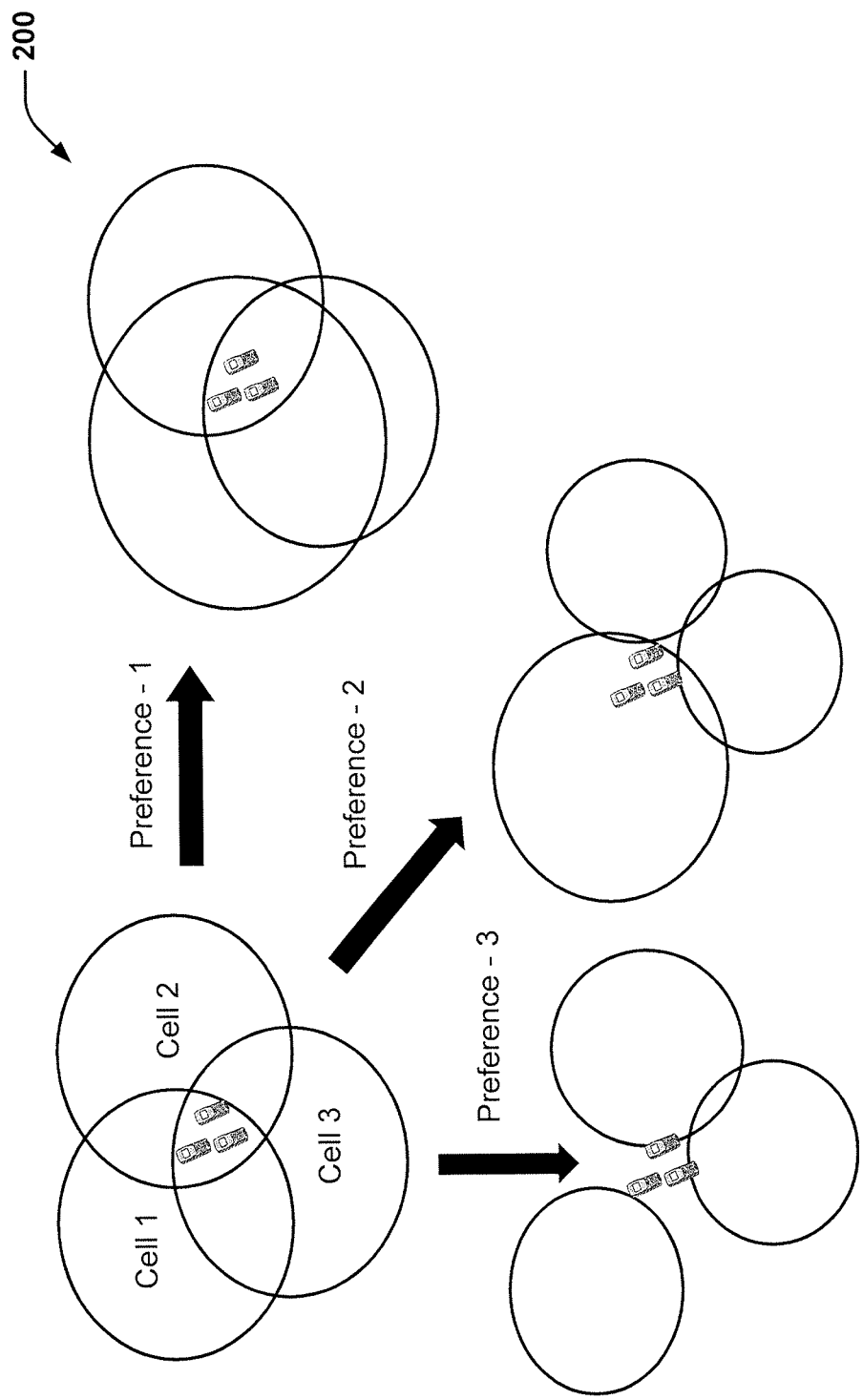
FIG. 2 is a schematic diagram of several example mechanisms for dynamic power regulation of small cells according to one aspect.

An example aspect of this power regulation mechanism is illustrated in the diagram 200 of FIG. 2. As shown, one or more mobile devices fall within coverage area of three neighboring small cells: Cell 1, Cell 2 and Cell 3, which may cause ping-pong handovers between these cells. In one aspect, increasing Tx power of Cell 1 to move pilot pollution boundary so that no or fewer mobile devices are affected. This approach may be most preferred, even though it can cause increase in interference in Cells 2 and 3, which can be dealt through interference cancellation techniques at those cells. In another aspect, Cells 2 and 3 can reduce their Tx power. This approach also results in the shift in pilot pollution region and/or possibly reduction of pilot pollution region due to reduction in the overlap between small cells. However, this approach is less preferred, as it may result in loss of offload from the macrocell. In yet another aspect, all small cells can reduce Tx power to eliminate pilot pollution and cause users to be served by macrocell. This approach effectively eliminates pilot pollution, but it is least preferred as it significantly reduces offload to the small cells.

Figure 3:
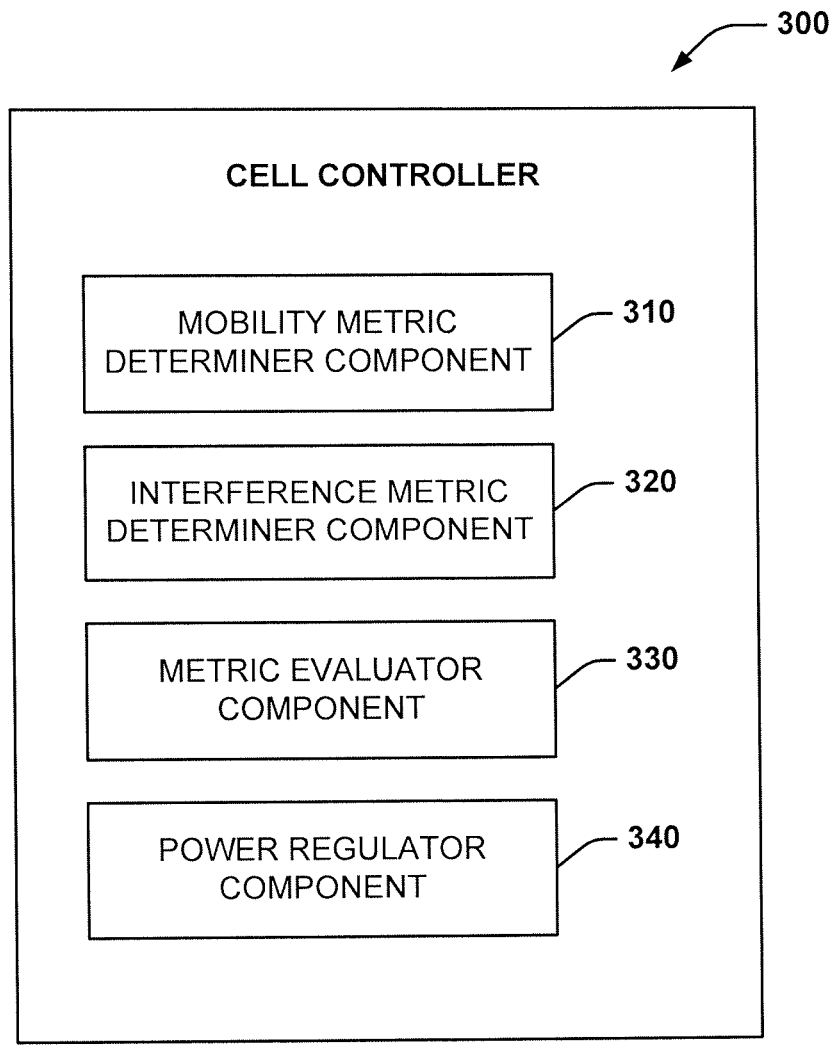
FIG. 3 is a diagram of an example system for dynamic power regulation of small cells according to one aspect.

FIG. 3 illustrates one example implementation of a cell controller operable to perform dynamic power regulation of small cells based on the principles disclosed herein. In one aspect, the cell controller 300, including one or more components thereof, may be implemented in low-power nodes 104 and 106 of FIG. 1. In another aspect, the cell controller 300, including one or more components thereof, may be implemented in a separate computer device in a mobile operator core network 110. In either implementation, cell controller 300 may include at least the following components: a mobility metric determiner component 310, an interference metric determiner component 320, a metric evaluator component 330 and a power regulator component 340, which will be described in greater detail herein below.

In one aspect, the mobility metric determiner component 310 of the cell controller 300 is configured to determine one or more mobility metrics of a small cell. In various aspects, the mobility metric may be based on a number of handovers per unit time (for example, per minute) at the cell, a number of ping-pong handovers between adjacent cells, or a ratio of the number of ping-pong handovers to the number of non-ping-pong handovers. This information may be obtained from the PL/RSCP measurements and/or "UE History Information" information element (IE), which can be passed during handovers between small cells. This IE contains information on the cells (e.g., up to 16) that a mobile device has been served by in active state prior to the target cell. For each of these cells, the IE contains cell identity, cell type (e.g., very small, small, medium, large, macro, femto, etc.) and the time mobile device stayed in that cell. Having obtained the handover history information, the mobility metric determiner component 310 may determine the number of ping-pong handovers based, for example, on the average time spent by mobile devices on the past cells and/or the repetition of cell identities (for example, occurrence of at least once cell identity more than once). Handovers that are performed more frequently than a certain time threshold (e.g., a few seconds) and result in cell changes where at least once cell identity occurs more than once, may be considered to be ping-pong handovers. The time threshold parameter may be selected based on simulation or system requirements. In other aspects, the mobility metrics may be based on the number of call drops or connection failures in the small cell, the number for link failures or handover failures in the small cell, and the number of mobile devices served by the small cell. In yet another aspect, the mobility metric determiner component 310 may observe and collect data on different mobility parameter for a certain predetermined period of time (e.g., several hours or days) before computing one or more mobility metrics based on the collected parameter information.

In another aspect, the interference metric determiner component 320 of the cell controller 300 is configured to determine one or more interference metrics of a small cell. For example, Signal-to-Interference-plus-Noise Ratio (SINR) of the small cell users (for example, mobile devices served by the small cell) may be used as or be a part of interference metric. In one aspect, the component 320 may observe and collect SINR data for a certain predetermined period of time (e.g., several hours or days) and determine average SINR for the monitored period of time. In another example, the interference metric may be based on path loss measurements of the neighboring cells performed by the small cell or small cell users.

In one aspect, the metric evaluator component 330 is configured to determining whether the values of mobility metric and/or interference metrics are acceptable or unacceptable. Particularly, to determine acceptability of the metrics, the component 330 may compare the values of mobility and interference metrics with the preset mobility and interference metric thresholds, respectively. For example, for a handover-based mobility metric, a mobility metric threshold may indicate the maximum number of handovers or ping-pong handovers that a small cell is allowed have before is should regulate its transmit power in order to decrease the number of ping-pong handovers. In another example, for mobility metric may be based on the number of mobile devices that a small cell servers. A small cell serving more number of mobile devices may be more reluctant to regulate (especially, decrease) its power. As an example, the mobility metric threshold may indicate the maximum number of average served mobile devices by a small cell below which a small cell can regulate its transmit power in order to offload some of the mobile devices to other cells. In yet another aspect, an interference metric may indicate the minimum SINR that a small cell may have before it should regulate its transmit power in order to expand or shrink its pilot pollution region. The different metric thresholds may be selected based on simulation or system requirements.

In another aspect, the power regulator component 340 of the cell controller 300 is configured to adjust the transmit power of the small cell based on the results of evaluation of the mobility and/or interference metrics. In one aspect, the power regulator component 340 is configured to prioritize the mobility metrics over interference metrics during power regulation. For example, if the ratio of ping-pong to non-ping-pong handovers is high, then many mobile devices are in the pilot pollution area and hence, such a small cell should adjust its transit power. In another example, if many mobile devices spend less time on a small cell, then this small cell may be leaking in an undesired region and needs to adjust its power to improve mobility. In another example, if a small cell serves many mobile devices, especially non-ping-pong high path loss mobile devices, then this small cell may be contributing significantly to offload and hence, should be conservative in shrinking its power. In another example, if most of the handovers to or from a small cell are not successful (e.g., lead to RLF at the mobile device), then this small cell needs to adjust its power to improve mobility.

More specifically, in one aspect, when the metrics evaluator component 330 determines that the mobility metric is unacceptable (e.g., the number of ping-pong handovers exceeds the allowable ping-pong handover threshold), the power regulator component 340 may increase the transmit power of the small cell until the mobility metric of the small cell becomes acceptable (e.g., the number of ping-pong handovers falls below the allowable ping-pong handover threshold). However, if the mobility metric of the small cell does not become acceptable, the power regulator component 340 may decrease the transmit power of the small cell to its minimum value (which will effectively reduce the ping-pong region of the small cell and reduce the number of ping-pong handovers, since mobile devices will offload to a neighbor small cell). In another example, when the metrics evaluator component 330 determines that the interference metric is unacceptable (e.g., average SINR of users or most of the users SINR is below allowed SINR threshold, which may indicate a strong interference from neighboring small cells), the power regulator component 340 may decrease the transmit power to reduce interference metric of the small cell until either the interference metric becomes acceptable (e.g., average SINR of users or most of the users SINR raises above allowed SINR threshold) or the mobility metric of the small cell remains acceptable (e.g., the number of ping-pong handovers remains below the allowable ping-pong handover threshold), and maintain the transmit power of the small cell at the reduced level, so that the mobility metric of the small cell remains below the mobility metric threshold.

In another aspect, in which the cell controller 300 is located in the core network 120 and, therefore, has information about transmit power of all nodes in its wireless network, the power regulator component 340 may regulate power of several neighboring small cells 114 and 116 and macrocells 112 to optimize offload and reduce ping-pong handovers between cells. For example, when the power regulator component 340 decided to increase the transmit power of one small cell until the mobility metric of that small cell becomes acceptable (e.g., decreases below the mobility metric threshold), the component 340 may simultaneously maintain the transmit power of one or more neighboring cells unchanged. In another example, when the power regulator component 340 decided to maintain the transmit power of a small cell, so that the mobility metric of the small cell remains below the mobility metric threshold, the component 340 may decide to decrease the transmit power of one or more neighboring small cells. In yet another example, when the power regulator component 340 decided to decrease the transmit power of several small cells, the component 340 may instruct the small cells to handover all of the mobile devices they serve to the neighboring macrocell.

In one aspect, when a new small cell is added to the wireless network 100, the power regulator component 340 of the cell controller 300 of the new small cell may at first automatically set the transmit power of the small cell to its maximum value. The cell controller 300 may then evaluate various mobility and interference metrics for a specified period of time (e.g., a day for new cells and a week for old cells) and then take appropriate power regulating action as described above. In one aspect, when a new small cell is added in the neighborhood, old small cells can re-trigger their power regulating algorithms as well. New small cell can be discovered via either messaging between small cells (for example, over X2 interface) or radio measurements performed at a small cell.

FIGS. 4A, 4B, 4C, 4D and 4E illustrate example methodologies for dynamic power regulation, which can be implemented by a cell controller 300 of FIG. 3. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4A:
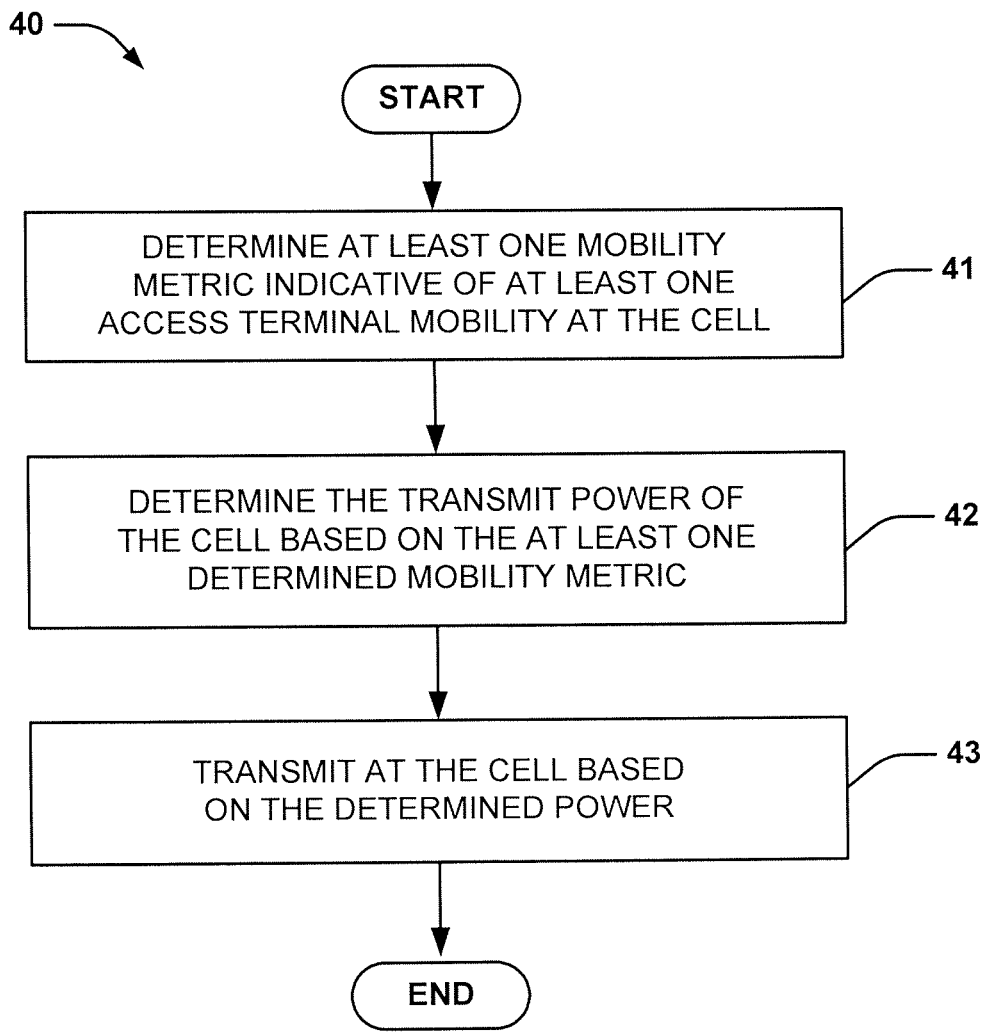
FIGS. 4A, 4B, 4C, 4D and 4E are flow diagrams of several example methodologies for dynamic power regulation of small cells according to various aspects.
Figure 7:
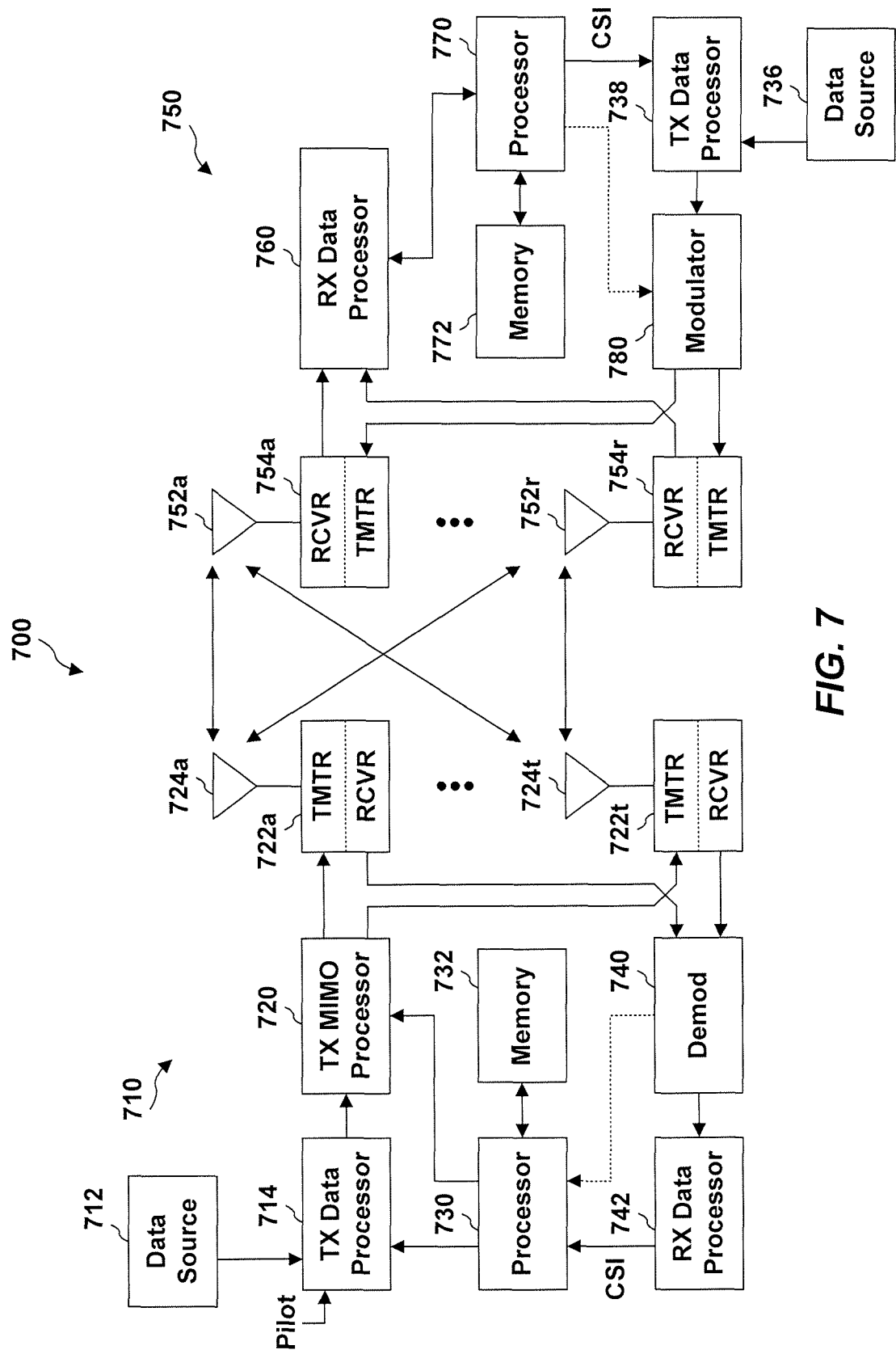
FIG. 7 is an illustration of an example wireless network environment that can be employed in conjunction with the various systems and methods described herein.

Turning to FIG. 4A, at step 41, the method 40 includes determining at least one mobility metric of a small cell. For example, in one aspect, the mobility metric determiner component 310 of the cell controller 300 may be configured to determine at least one mobility metric, such as the number of ping-pong handovers. At step 42, the method 40 includes determining the transmit power of the cell based on the at least one determined mobility metric. In one aspect, the power regulator component 340 of the cell controller 300 may be configured to determine the transmit power of a small cell. At step 43, the method 40 includes transmitting at the cell based on the determined power. In one aspect, a transmitter 722a of a low-power node 710 of FIG. 7 is configured to transmit RF signals at the determined transmit power.

Figure 4B:
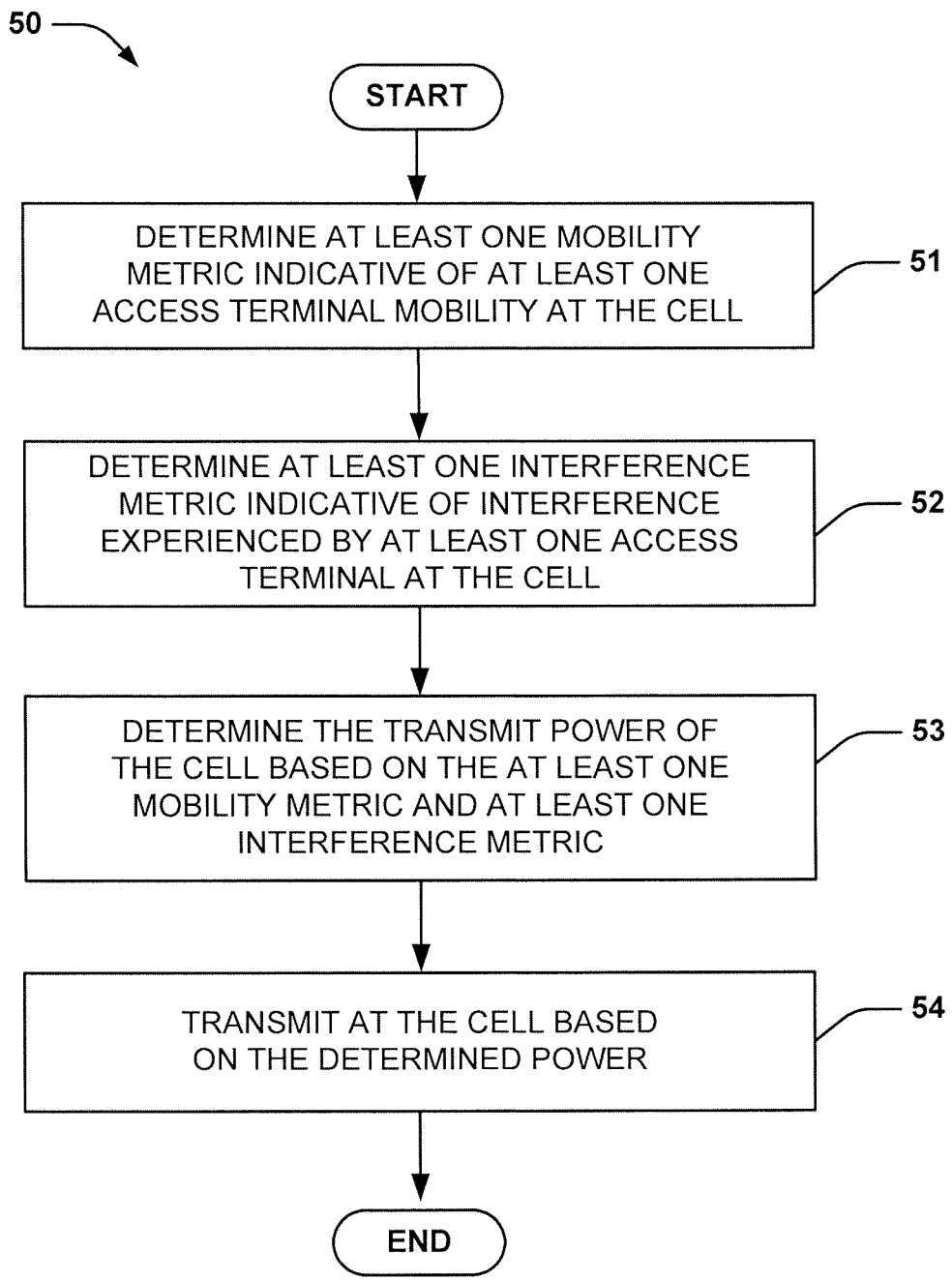

Turning to FIG. 4B, at step 51, the method 50 includes determining at least one mobility metric of a small cell. For example, in one aspect, the mobility metric determiner component 310 of the cell controller 300 may be configured to determine at least one mobility metric, such as the number of ping-pong handovers. At step 52, the method 50 includes determining at least one interference metric of the cell. In one aspect, the interference metric determiner component 320 of the cell controller 300 may be configured to determine at least one interference metric, such as the SINR of the served small cell users. At step 53, the method 50 includes determining the transmit power of the cell based on the at least one determined interference metric and the at least one determined mobility metric. In one aspect, the power regulator component 340 of the cell controller 300 may be configured to determine the transmit power of a small cell. At step 54, the method 50 includes transmitting at the cell based on the determined power. In one aspect, a transmitter 722a of a low-power node 710 of FIG. 7 is configured to transmit RF signals at the determined transmit power.

Figure 4C:
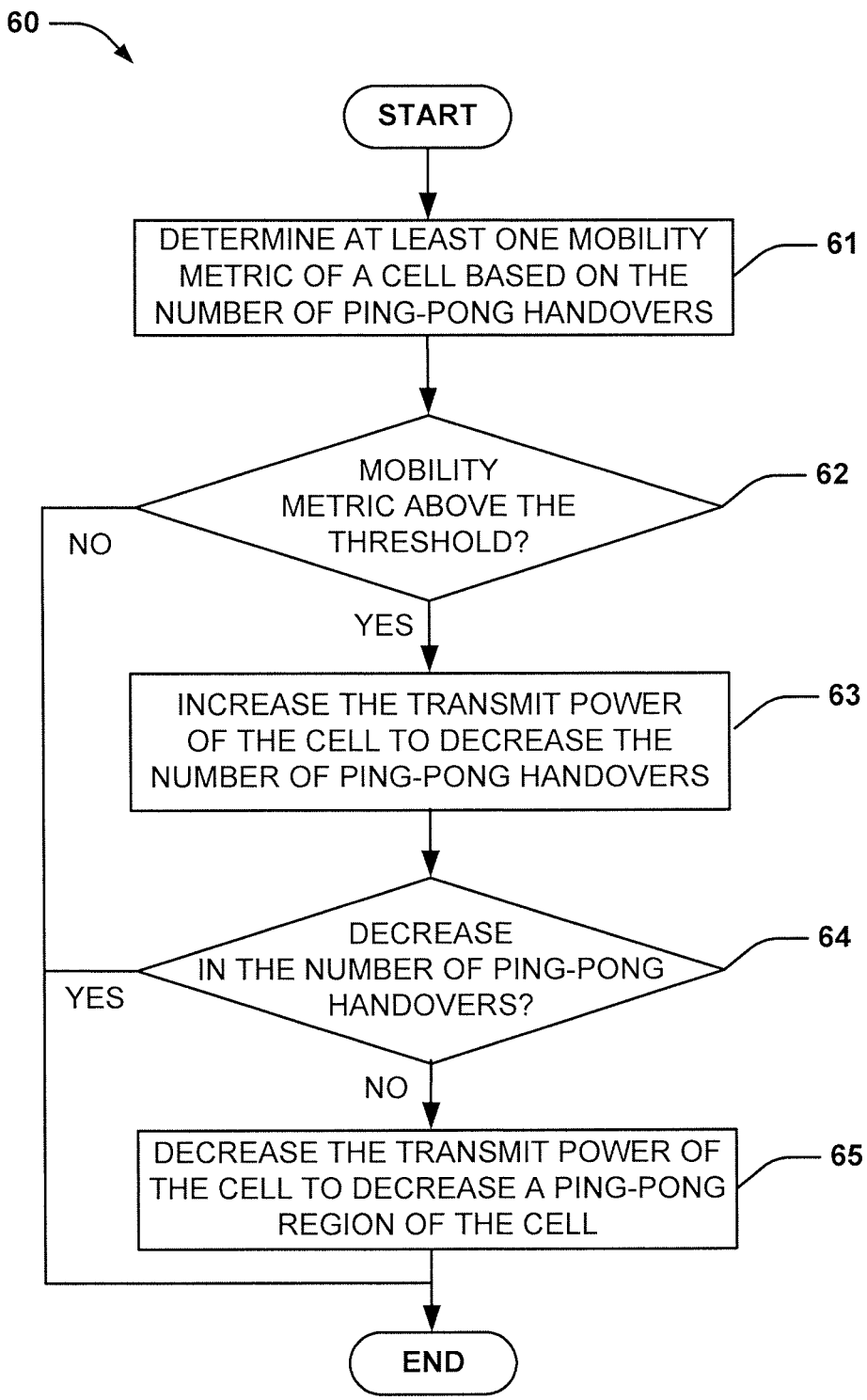

Turning to FIG. 4C, at step 61, the method 60 includes determining at least one mobility metric of a small cell based on the number of ping-pong handovers. For example, in one aspect, the mobility metric determiner component 310 of the cell controller 300 may be configured to determine at least one mobility metric based on the number of ping-pong handovers. At step 62, the method 60 includes determining whether the mobility metric is above a mobility metric threshold. In one aspect, the mobility metric evaluator component 330 of the cell controller 300 may be configured to determine whether the mobility metric is above the mobility metric threshold. At step 63, the method 60 includes increasing the transmit power of the cell to decrease the number of ping-pong handovers. In one aspect, the power regulator component 340 of the cell controller 300 may be configured to increase the transmit power of the cell. At step 64, the method 60 includes determining whether the number of ping-pong handovers does not decrease, and when the number of ping-pong handovers does not decrease, then at step 65, the method 60 includes decreasing the transmit power of the cell to decrease a ping-pong region of the cell. In one aspect, the power regulator component 340 may be configured decrease the transmit power of the cell.

Figure 4D:
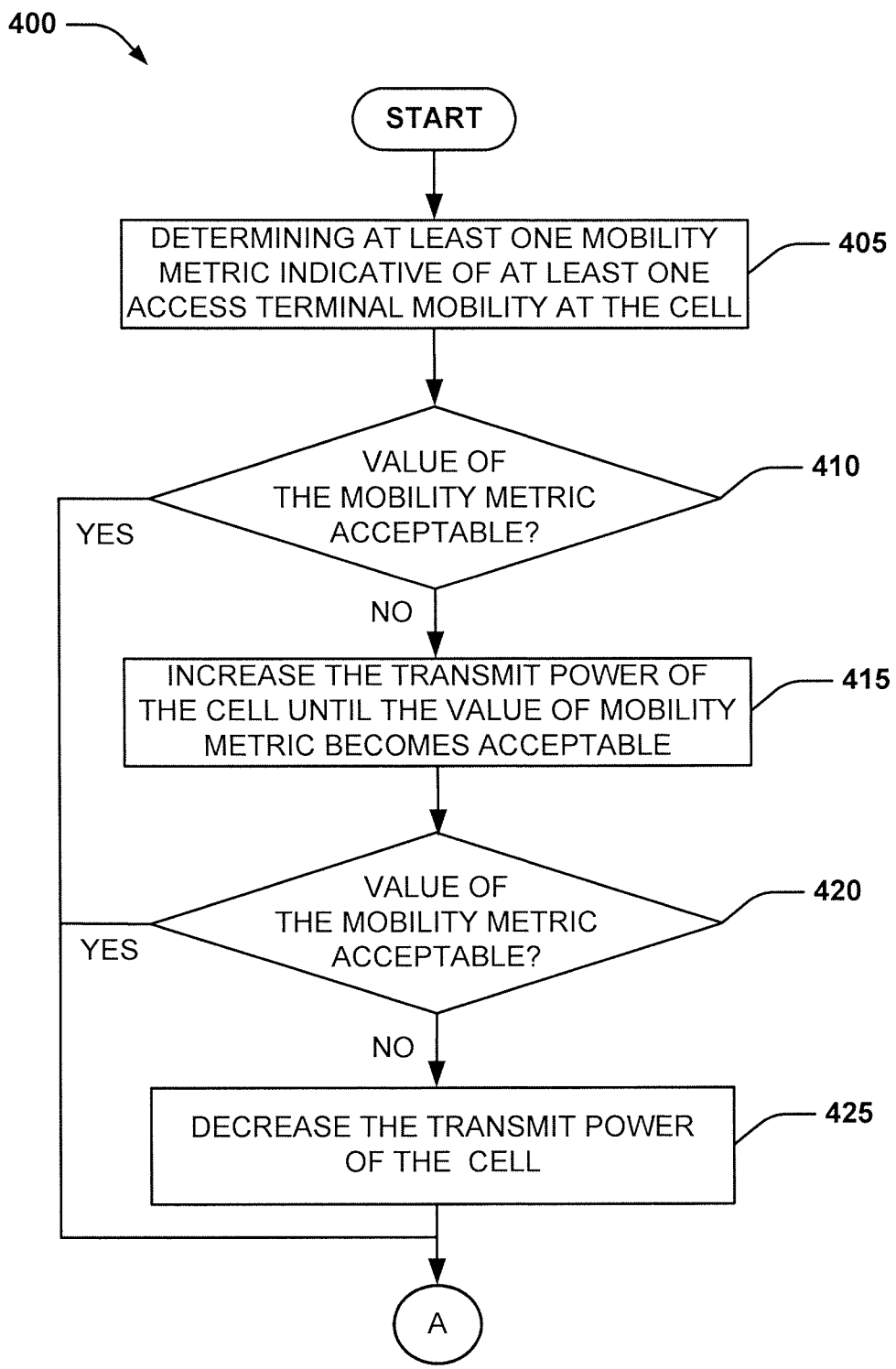

Turning to FIG. 4D, at step 405, the method 400 includes determining at least one mobility metric of a small cell. For example, in one aspect, the mobility metric determiner component 310 of the cell controller 300 may be configured to determine at least one mobility metric, such as the number of ping-pong handovers. At step 410, the method 400 includes determining if the mobility metric is acceptable. In one aspect, the metric evaluator component 330 of the cell controller 300 may be configured to compare the mobility metric with a mobility metric threshold. At step 415, the method 400 includes, when the mobility metric is unacceptable (e.g., above the mobility metric threshold), increasing the transmit power of the small cell until the mobility metric becomes acceptable (e.g., mobility metric decreases below the mobility metric threshold). In one aspect, the power regulator component 320 of the cell controller 300 may be configured to increase the transmit power of the small cell. At step 420, the method 400 includes, when it is determined that the mobility metric remains unacceptable (e.g., does not decrease below the mobility metric threshold), at step 425, decreasing the transmit power of the cell. In one aspect, the power regulator component 340 may be configured to decrease the transmit power.

Figure 4E:
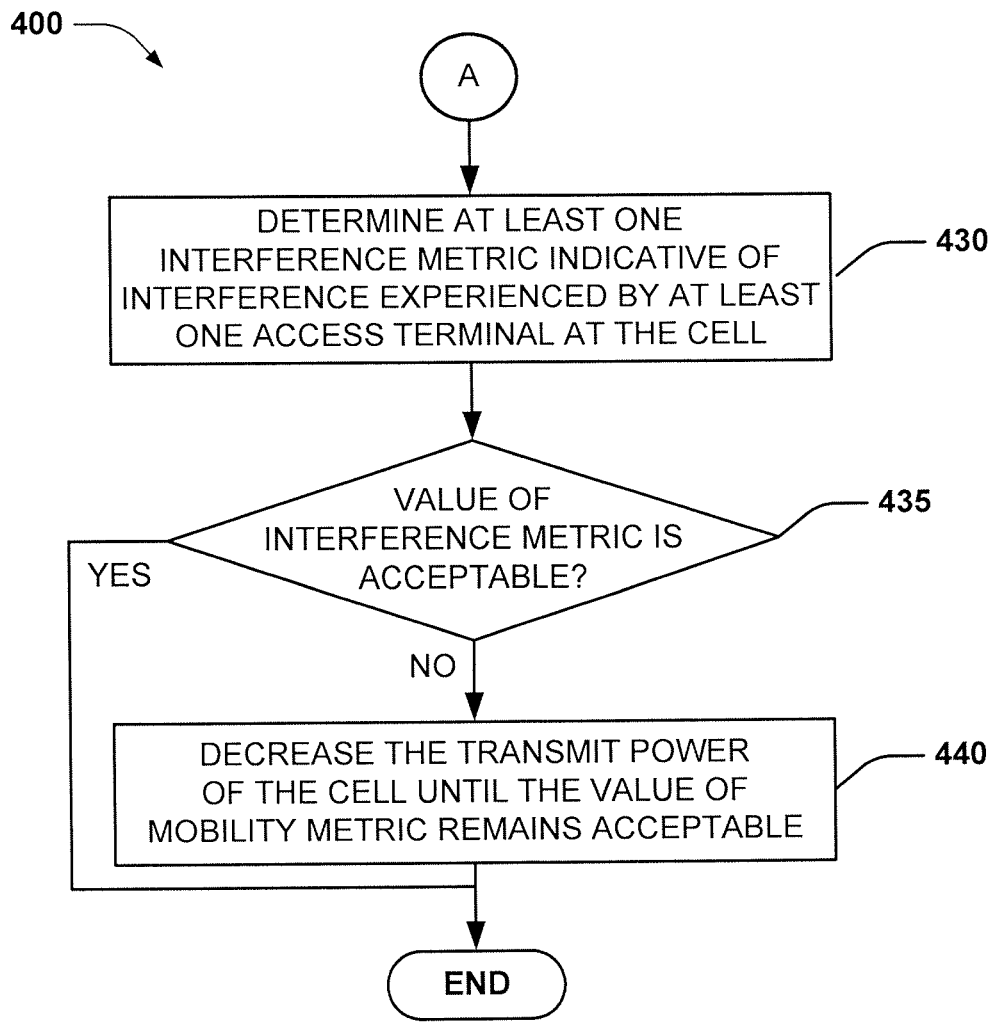

Turning to FIG. 4E, at step 430, the method 400 further includes determining at least one interference metric of the small cell. For example, in one aspect, the interference metric determiner component 310 of the cell controller 300 may be configured to determine at least one interference metric, such as SINR. At step 435, the method 400 includes determining if the interference metric is acceptable. In one aspect, the metric evaluator component 330 of the cell controller 300 may be configured to compare the interference metric with an interference metric threshold. At steps 440 and 445, the method 400 includes, when the interference metric is determined to be unacceptable (e.g., the interference metric is below the interference metric threshold), decreasing the transmit power of the small cell until the mobility metric remains acceptable (e.g., mobility metric remains below the mobility metric threshold) and interference metric improves and possibly, becomes acceptable. In one aspect, the power regulator component 320 of the cell controller 300 may be configured to decrease the transmit power of the small cell. At step 450, the method 400 includes maintaining the transmit power of the small cell, so that the mobility metric of the small cell remains below the mobility metric threshold.

Figure 5:
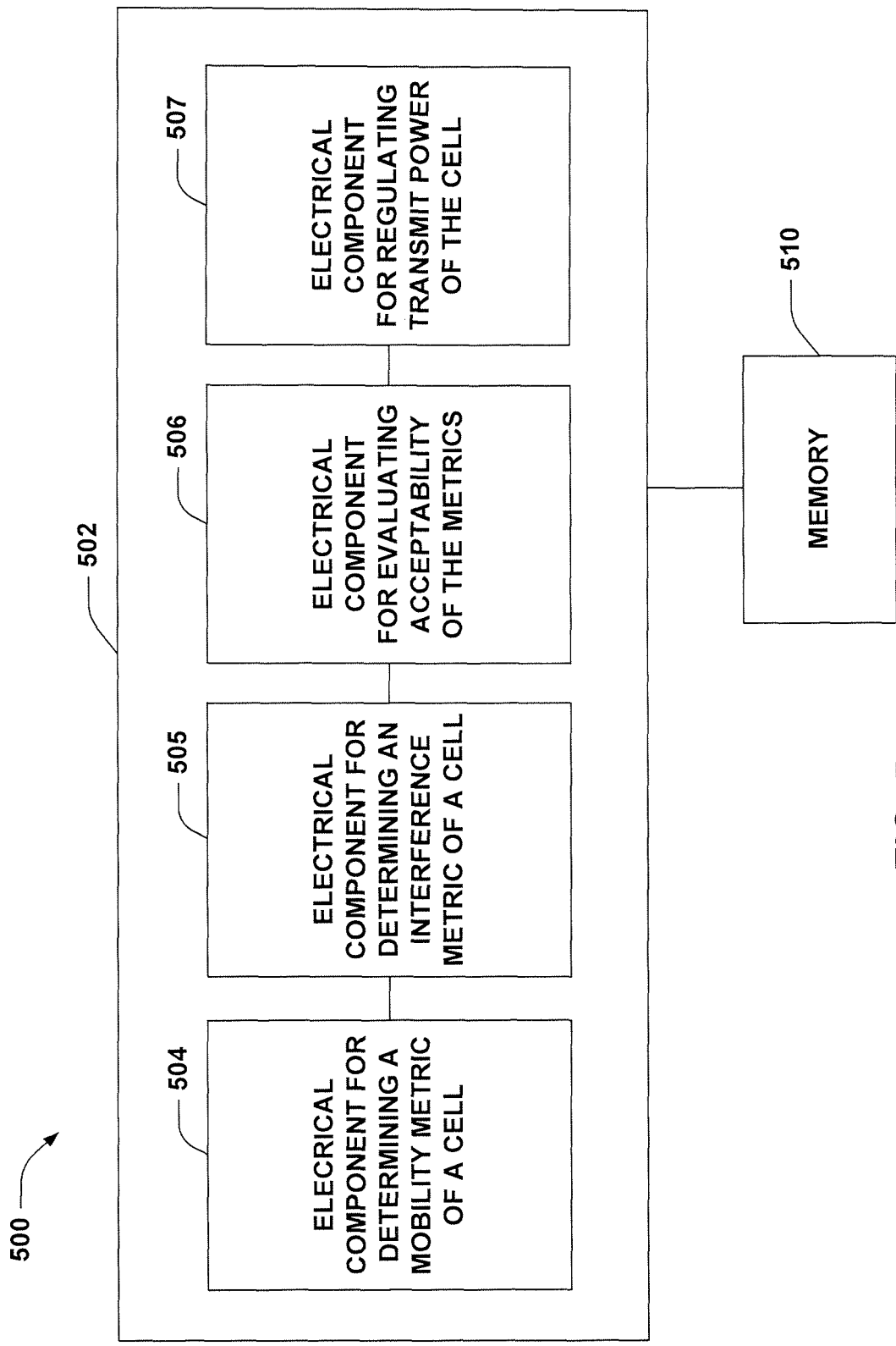
FIG. 5 is a block diagram of an example system for dynamic power regulation of small cells according to one aspect.

FIG. 5 illustrates a system 500 for dynamic power regulation in a small cell. For example, system 500 can be implemented in cell controller 300 of FIG. 3, which may reside within a low-power node 104 or 106 of FIG. 1. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component 504 for determining a mobility metric of a small cell. Further, logical grouping 502 can comprise an electrical component 505 for determining an interference metric of the small cell. Further, logical grouping 502 can include an electrical component 506 for evaluating acceptability of mobility and interference metrics. Further, logical grouping 502 can include an electrical component 507 for regulating transmit power of the small cell.

Additionally, system 500 can include a memory 510 that retains instructions for executing functions associated with the electrical components 504-507. While shown as being external to memory 510, it is to be understood that one or more of the electrical components 504-507 can exist within memory 510. In one example, electrical components 504-507 can comprise at least one processor, or each electrical component 504-507 can be a corresponding module of at least one processor. Moreover, in an additional or alternative example, electrical components 504-507 can be a computer program product comprising a computer readable medium, where each electrical component 504-507 can be corresponding code.

Figure 6:
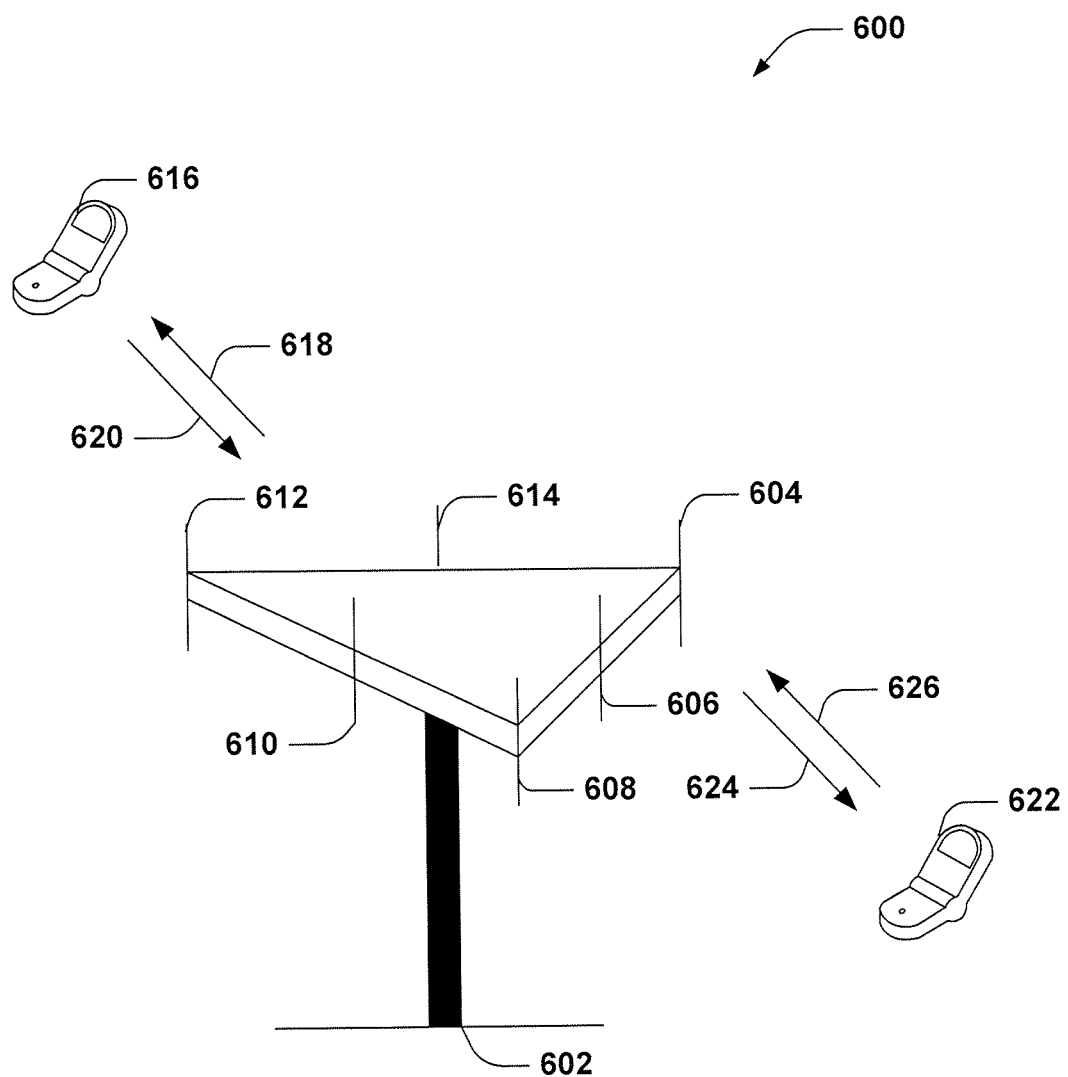
FIG. 6 is a block diagram of an example wireless communication system in accordance with various aspects set forth herein.

Referring now to FIG. 6, a wireless communication system 600 in which mechanisms for dynamic power regulation in a small cell may be implemented. System 600 comprises a base station 602, which may be implemented in low-power nodes 104 or 106 of FIG. 1, and may include the components and implement the functions described above with respect to FIGS. 1-5. In one aspect, base station 602 can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622, such as a mobile device 105 of FIG. 1; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

FIG. 7 shows an example wireless communication system 700. The wireless communication system 700 depicts one base station 710, which can be implemented in a low-power node 104 of FIG. 1, and one mobile device 750 for sake of brevity, as such as mobile device 105 of FIG. 1. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 2, 3, 5, and 6) and/or methods (FIGS. 4A and 4B) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more low-power nodes.

Figure 8:
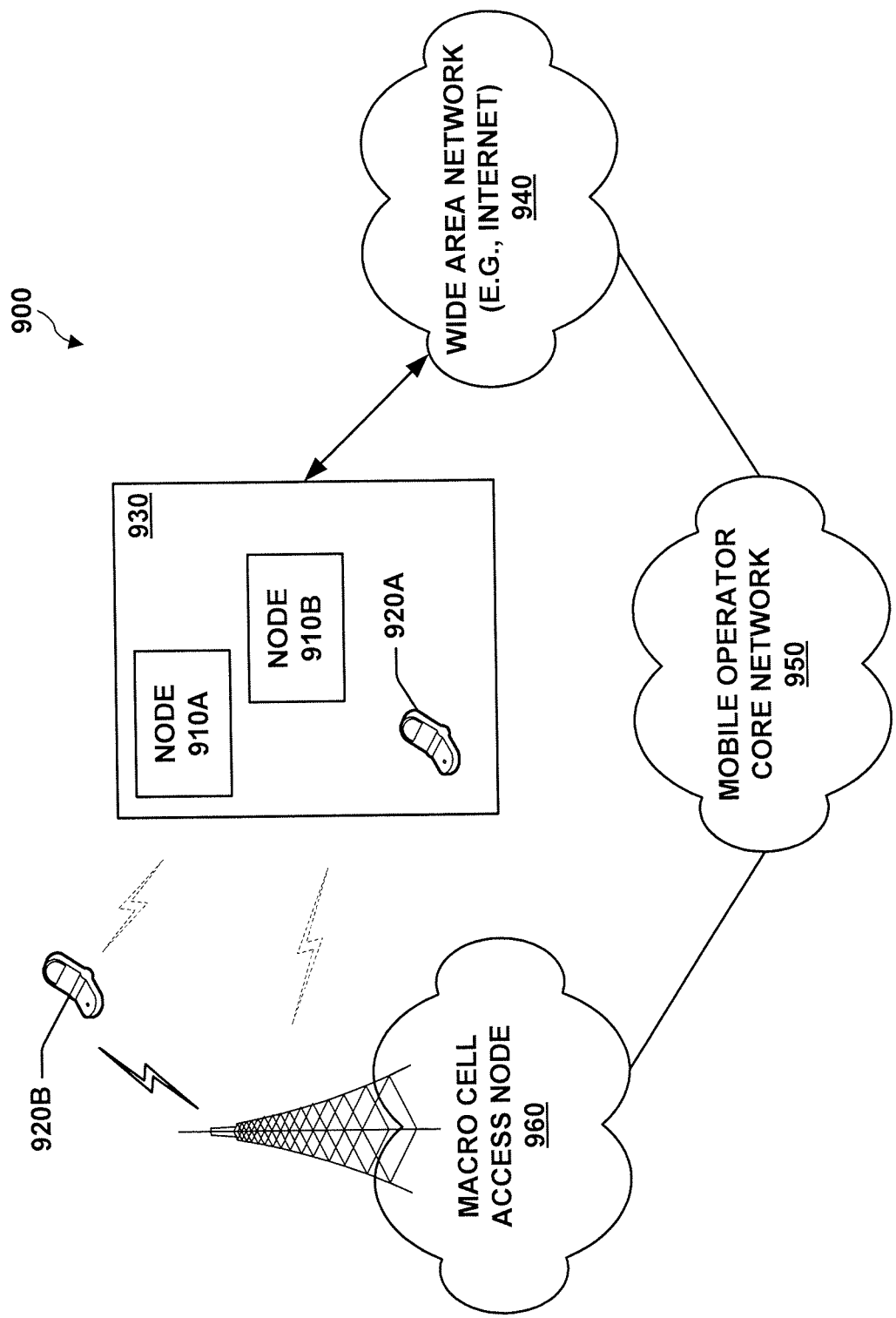
FIG. 8 is an illustration of an exemplary communication system to enable deployment of small cells within a network environment.

FIG. 8 illustrates an exemplary communication system 900 where one or more low-power nodes are deployed within a network environment. Specifically, the system 900 includes multiple low-power nodes 910A and 910B (e.g., femtocell nodes or H(e)NB) installed in a relatively small scale network environment (e.g., in one or more user residences 930). Nodes 910A and 910B may, in one aspect, correspond to low-power nodes 104 and 106 of FIG. 1. Each low-power node 910 can be coupled to a wide area network 940 (e.g., the Internet) and a mobile operator core network 950 via a digital subscriber line (DSL) router, a cable modem, a wireless link, or other connectivity means (not shown). As will be discussed below, each low-power node 910 can be configured to serve associated mobile devices 920 (e.g., mobile device 920A) and, optionally, alien mobile devices 920 (e.g., mobile device 920B). In other words, access to low-power nodes 910 can be restricted such that a given mobile device 920 can be served by a set of designated (e.g., home) low-power node(s) 910 but may not be served by any non-designated low-power nodes 910 (e.g., a neighbor's small cell).

The owner of a low-power node 910 can subscribe to mobile service, such as, for example, 3G mobile service, offered through the mobile operator core network 950. In another example, the low-power node 910 can be operated by the mobile operator core network 950 to expand coverage of the wireless network. In addition, a mobile device 920 can be capable of operating both in macro environments and in smaller scale (e.g., residential) network environments. Thus, for example, depending on the current location of the mobile device 920, the mobile device 920 can be served by a macro cell access node 960 or by any one of a set of low-power nodes 910 (e.g., the low-power nodes 910A and 910B that reside within a corresponding user residence 930). For example, when a subscriber is outside his home, he is served by a standard macro cell access node (e.g., node 960) and when the subscriber is at home, he is served by a low-power node (e.g., node 910A). Here, it should be appreciated that a low-power node 910 can be backward compatible with existing mobile devices 920.

A low-power node 910 can be deployed on a single frequency or, in the alternative, on multiple frequencies. Depending on the particular configuration, the single frequency or one or more of the multiple frequencies can overlap with one or more frequencies used by a macro cell access node (e.g., node 960). In some aspects, an mobile device 920 can be configured to connect to a preferred low-power node (e.g., the home low-power node of the mobile device 920) whenever such connectivity is possible. For example, whenever the mobile device 920 is within the user's residence 930, it can communicate with the home low-power node 910.

In some aspects, if the mobile device 920 operates within the mobile operator core network 950 but is not residing on its most preferred network (e.g., as defined in a preferred roaming list), the mobile device 920 can continue to search for the most preferred network (e.g., low-power node 910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 920 can limit the search for specific band and channel. For example, the search for the most preferred system can be repeated periodically. Upon discovery of a preferred low-power node, such as low-power node 910, the mobile device 920 selects the low-power node 910 for camping within its coverage area.

A low-power node can be restricted in some aspects. For example, a given low-power node can only provide certain services to certain mobile devices. In deployments with socalled restricted (or closed) association, a given mobile device can only be served by the macro cell mobile network and a defined set of low-power nodes (e.g., the low-power nodes 910 that reside within the corresponding user residence 930). In some implementations, a low-power node can be restricted to not provide, for at least one mobile device, at least one of: signaling, data access, registration, paging, or service.

In some aspects, a restricted low-power node (which can also be referred to as a Closed Subscriber Group H(e)NB) is one that provides service to a restricted provisioned set of mobile devices. This set can be temporarily or permanently extended as necessary. In some aspects, a Closed Subscriber Group (CSG) can be defined as the set of access nodes (e.g., low-power nodes) that share a common access control list of mobile devices. A channel on which all low-power nodes (or all restricted low-power nodes) in a region operate can be referred to as a low-power channel.

Various relationships can thus exist between a given low-power node and a given mobile device. For example, from the perspective of a mobile device, an open low-power node can refer to a low-power node with no restricted association. A restricted low-power node can refer to a low-power node that is restricted in some manner (e.g., restricted for association and/or registration). A home low-power node can refer to a node on which the mobile device is authorized to access and operate on. A guest low-power node can refer to a low-power node on which a mobile device is temporarily authorized to access or operate on. An alien low-power node can refer to a low-power node on which the mobile device is not authorized to access or operate on, except for perhaps emergency situations (e.g., 911 calls).

From a restricted low-power node perspective, a home mobile device can refer to an mobile device that authorized to access the restricted low-power node. A guest mobile device can refer to a mobile device with temporary access to the restricted low-power node. An alien mobile device can refer to a mobile device that does not have permission to access the restricted low-power node, except for perhaps emergency situations, for example, 911 calls (e.g., an access terminal that does not have the credentials or permission to register with the restricted low-power node).

For convenience, the disclosure herein describes various functionality in the context of a low-power node. It should be appreciated, however, that a pico node can provide the same or similar functionality as a low-power node, but for a larger coverage area. For example, a pico node can be restricted, a home pico node can be defined for a given mobile device, and so on.

A wireless multiple-access communication system can simultaneously support communication for multiple wireless mobile devices. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

As used herein, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for regulating transmit power of a small cell, comprising:
    determining a value of at least one mobility metric indicative of at least one access terminal mobility at the cell;
    determining whether the value of the at least one mobility metric is acceptable;
    in response to determining that the value of the at least one mobility metric is unacceptable, increasing the transmit power of the cell;
    determining a value of at least one interference metric indicative of interference experienced by at least one access terminal at the cell;
    determining whether the value of the at least one interference metric is acceptable after increasing the transmit power of the cell; and
    in response to determining that the value of the at least one interference metric is unacceptable and the value of the at least one mobility metric is acceptable, decreasing the transmit power of the cell while the value of the at least one mobility metric remains acceptable.

2. The method of claim 1, wherein determining whether the value of the at least one mobility metric is acceptable comprises comparing the value of the at least one mobility metric with a second threshold.

3. The method of claim 1, wherein the values of the at least one mobility metric and of the at least one interference metric are determined over a predetermined period of time.

4. The method of claim 1, wherein the value of the at least one mobility metric is based on a number of or a ratio of access terminals performing cell changes wherein at least one cell occurs more than once.

5. The method of claim 1, wherein the at least one mobility metric is based on at least one of one or more of a number of connection failures or handover failures in the cell, and a number of access terminals served by the cell.

6. The method of claim 1, wherein the at least one interference metric is based on a Signal-to-Interference-plus-Noise Ratio (SINR).

7. The method of claim 1, wherein increasing the transmit power of the cell includes increasing the transmit power of the cell until the value of the at least one mobility metric of the cell becomes acceptable and then maintaining a constant transmit power.

8. The method of claim 1, wherein decreasing the transmit power of the cell further includes handing over one or more access terminals to a neighboring cell.

9. An apparatus for regulating transmit power of a small cell, comprising:
    a memory configured to store data; and
    at least one processor communicatively coupled to the memory, the at least one processor being configured to execute instructions to process the data in the memory to:
        determine a value of at least one mobility metric indicative of at least one access terminal mobility at the cell;
        determine whether the value of the at least one mobility metric is acceptable;
        in response to determining that the value of the at least one mobility metric is unacceptable, increase the transmit power of the cell;
        determine a value of at least one interference metric indicative of interference experienced by at least one access terminal at the cell;
        determine whether the value of the at least one interference metric is acceptable; and
        in response to determining that the value of the at least one interference metric is unacceptable and the value of the at least one mobility metric is acceptable, decrease the transmit power of the cell while the value of the at least one mobility metric remains acceptable.

10. The apparatus of claim 9, wherein to determine whether the value of the at least one mobility metric is acceptable, the at least one processor is configured to compare the value of the at least one mobility metric with a second threshold.

11. The apparatus of claim 9, wherein the processor is configured to determine the values of the at least one mobility metric and of the at least one interference metric over a predetermined period of time.

12. The apparatus of claim 9, wherein the at least one processor is configured to determine the value of the at least one mobility metric based on a number of or a ratio of access terminals performing cell changes wherein at least one cell occurs more than once.

13. The apparatus of claim 9, wherein the at least one processor is configured to determine the value of the at least one mobility metric based on at least one or both of a number of connection failures or handover failures in the cell, and a number of access terminals served by the cell.

14. The apparatus of claim 9, wherein the at least one interference metric is based on a Signal-to-Interference-plus-Noise Ratio (SINR).

15. The apparatus of claim 9, wherein the at least one processor is configured to increase the transmit power of the cell until the value of the at least one mobility metric of the cell becomes acceptable and then maintain a constant transmit power.

16. The apparatus of claim 9, wherein the at least one processor is further configured to after decreasing the transmit power of the cell, hand over one or more access terminals to a neighboring cell.

17. An apparatus for regulating transmit power of a small cell, comprising:
    means for determining a value of at least one mobility metric indicative of at least one access terminal mobility at the cell;
    means for determining whether the value of the at least one mobility metric is acceptable;
    means for increasing the transmit power of the cell in response to determining that the value of the at least one mobility metric is unacceptable;

means for determining a value of at least one interference metric indicative of interference experienced by at least one access terminal at the cell;

means for determining whether the value of the at least one interference metric is acceptable; and means for decreasing the transmit power of the cell while the value of the at least one mobility metric remains acceptable in response to determining that the value of the at least one interference metric is unacceptable and the value of the at least one mobility metric is acceptable.

18. The apparatus of claim 17, wherein determining whether the value of the at least one mobility metric is acceptable comprises comparing the value of the at least one mobility metric with a second threshold.

19. A non-transitory computer readable medium storing computer executable code for regulating transmit power of a small cell, comprising:

code for determining a value of at least one mobility metric indicative of at least one access terminal mobility at the cell;

code for determining whether the value of the at least one mobility metric is acceptable;

code for increasing the transmit power of the cell in response to determining that the value of the at least one mobility metric is unacceptable;

code for determining a value of at least one interference metric indicative of interference experienced by at least one access terminal at the cell;

code for determining whether the value of the at least one interference metric is acceptable; and code for decreasing the transmit power of the cell while the value of mobility metric remains acceptable in response to determining that the value of the at least one interference metric is unacceptable and the value of the at least one mobility metric is acceptable.

20. The non-transitory computer readable medium of claim 19, wherein determining whether the value of the at least one mobility metric is acceptable comprises comparing the value of the at least one mobility metric with a second threshold.

21. The method of claim 1, wherein the value of the at least one mobility metric is based on an average time spent by the at least one access terminal in a past cell.

\* \* \* \* \*